United States Patent [19]

Maki et al.

[11] Patent Number: 4,762,375
[45] Date of Patent: Aug. 9, 1988

[54] ANTI-SKID CONTROL SYSTEM FOR MOTOR VEHICLES

[75] Inventors: Takao Maki, Kitakatsushika; Isao Yamaki, Iwatsuki; Hideo Akima, Yokohama; Akira Hoashi, Munakata, all of Japan

[73] Assignees: Akebono Brake Industry Co., Ltd., Tokyo; Fujitsu Limited, Kanagawa, both of Japan

[21] Appl. No.: 947,045

[22] Filed: Dec. 29, 1986

[30] Foreign Application Priority Data

Dec. 27, 1985 [JP] Japan .................... 60-29299

[51] Int. Cl.$^4$ .................... B60T 8/82; B60T 8/60; B60T 8/68
[52] U.S. Cl. .................... 303/96; 303/103; 303/109
[58] Field of Search .................... 303/94, 95, 96, 97, 303/103, 105, 106, 108, 109, 110, 111; 364/426

[56] References Cited

U.S. PATENT DOCUMENTS 4,446,522  5/1984  Sato et al. .................... 303/105
4,585,280  4/1986  Leiber .................... 303/105

Primary Examiner—Andres Kashnikow
Assistant Examiner—Timothy Newholm

[57] ABSTRACT

An anti-skid control system for a motor vehicle in which, when a wheel speed to be controlled and being decreased through buildup of brake pressure becomes equal to a reference speed, this equality is judged as a fulfillment of a brake pressure reduction starting condition, and thus reduction of the brake pressure is started. The highest wheel speed is detected and a computed vehicle speed is set up based on the highest wheel speed by having the increase and decrease of the highest wheel speed limited to a predetermined range. The computed vehicle speed and the wheel speed to be controlled are compared; and when the comparison indicates that the wheel speed to be controlled is equal to or higher than the computed vehicle speed, no reduction of the brake pressure is started irrespective of whether the brake pressure reduction starting condition is fulfilled.

4 Claims, 7 Drawing Sheets

ANTI-SKID CONTROL SYSTEM FOR MOTOR VEHICLES

BACKGROUND OF THE INVENTION

1. Field of the Invention

This invention relates to an anti-skid control system for motor vehicles, which is adapted to prevent the wheels of the motor vehicle from skidding during braking operation.

2. Description of the Prior Art

Generally, with an anti-skid control system for motor vehicles, anti-skid control is effected by means of microcomputers such that hold valves and decay valves comprising electromagnetic valves are opened and closed on the basis of electrical signals representing wheel speeds sensed by wheel speed sensors, thereby increasing, holding or reducing the brake pressure, for the purpose of securing improved steering performance and running stability of the motor vehicle, while at the same time shortening the braking distance.

FIG. 1 of the accompanying drawings illustrates, by way of example, the manners in which wheel speed Vw, wheel acceleration $+\dot{V}w$, wheel deceleration (negative acceleration) $-\dot{V}w$ and brake pressure are varied during the operation of the conventional anti-skid control system, together with hold signal HS and decay signal DS for opening and closing hold valves and decay valves.

Under such a condition that the hold signal HS and decay signal DS are both interrupted so that the hold valves remain opened while the decay valves remain closed, if braking operation is started at time t1, then the brake pressure Pw is increased from the time t1 onward so that the wheel speed Vw is decreased and thus the deceleration $-\dot{V}w$ thereof is gradually increased in absolute value. A reference wheel speed Vt is set up on the basis of the wheel speed Vw in such a manner that it is lower than the wheel speed Vw by a predetermined amount $\Delta V$ and follows the wheel speed Vw with such a speed difference and it linearly decreases with a gentle gradient of $-1G$ from time t2 when the wheel deceleration $-\dot{V}w$ reaches a predetermined threshold level, say $-1G$.

At time t3 when the wheel deceleration $-\dot{V}w$ reaches another predetermined threshold level $-Gmax$, the hold signal HS is interrupted, and thus the brake pressure Pw will be held at the value occurring at the time t3.

The wheel speed Vw is further decreased and becomes equal to the reference wheel speed Vt at time t4; thereupon the decay signal DS is generated, and reduction of the brake pressure Pw is started. As a result, the wheel speed Vw is changed from deceleration to acceleration at time t5, i.e., low-peak point. At time t6 when the wheel speed Vw recovered from the low peak by 15%, for example, of the difference between the wheel speed at the low-peak point t5 and the wheel speed Vw at the brake pressure reduction starting point t4, the decay signal DS is interrupted so that the decay valves are closed, and thus the brake pressure Pw is held at the value occurring at the time t6. The holding of the brake pressure Pw is continued until time t7 when a high peak of the wheel speed Vw is reached; at the high-peak point t7, the hold signal HS is interrupted so that the hold valves HV are opened and thus the brake pressure Pw is increased. In this case, the buildup of the brake pressure Pw effected from the time 7 onward is realized in such a manner that the brake pressure Pw is alternately increased and held in succession because of the hold signal HS being turned on and off intermittently so that the hold valves are opended intermittently; thus the brake pressure Pw is caused to build up gradually. At a time when the wheel speed Vw being decelerated becomes equal to the reference wheel speed Vt, like at the time 4, the decay signal DS is generated again, and thus reduction of the brake pressure Pw occurs. Similar control modes are repeated, and as a result, the vehicle speed is decreased gradually.

With the foregoing anti-skid control, when the vehicle runs on a road surface with a low friction coefficient $\mu$ (low-$\mu$ road surface), there is the tendency that the wheel speed is behind in recovery after the brake pressure is reduced; thus, a longer time is taken before the wheel speed Vw reaches a high peak which is the next pressure buildup starting point, or in some cases no high peak of the wheel speed occurs at all, as a result of which a non-braking condition persists all this while. To avoid persistence of such a non-braking condition, it has been the practice that a timer is provided which is adapted, when no brake pressure reduction stopping point is reached after a lapse of a predetermined time period, for forcibly interrupting the decay signal DS to close the decay vlaves and also interrupting the hold signal HS to open the hold valves, thereby causing the brake pressure Pw to be increased abruptly.

During the above-mentioned control operation, when the vehicle is running on a very low friction road surface such as frozen road surface, for example, it may happen that the wheel speed Vw of the wheel coupled to the driving axle is momentarily increased significantly over the vehicle speed for one reason or another, as indicated at K in FIG. 1. Such a momentary siginificant increase in the wheel speed will be referred to as "whisker" hereinafter. In such a case, the reference wheel speed Vt is also increased following the wheel speed Vw with the speed difference $\Delta V$, but when an abrupt decrease in the wheel speed Vw occurs subsequent to the above-mentioned momentary significant increase, the reference wheel speed Vt does not follow the wheel speed Vw and falls gently with the gradient of $-1G$; thus the wheel speed Vw and reference wheel speed Vt cross each other at time t8, as indicated at A in FIG. 1.

With the conventionl anti-skid control system, as mentioned above, when the wheel speed Vw becomes equal to the reference wheel speed Vt, this is judged, in the CPU of the microcomputer, as if the brake pressure reduction starting condition were met, so that the decay signal DS is generated, and thus reduction of the brake pressure Pw is started at time 8. However, this brake pressure reduction, unlike that started at the time 4, does not result in a low peak of the wheel speed Vw, and persists until time t9 when the decay signal is forcibly interrupted so that the decay valves are closed, by means of the timer which was started at the time 8. Specifically, assuming that the time set on the timer is 1.44 sec., the non-braking condition will persist for about 2 seconds, including the time period, say 0.6 seconds, from the time t9 to time 10 when the hold signal HS is turned off so that the hold valves are opened, by means of another timer started at the time t9. Obviously, this will lead to an increase in the braking distance.

SUMMARY OF THE INVENTION

Accordingly, it is an object of the present invention to provide a novel and improved anti-skid control system for motor vehicles, which is so designed that when the wheel speed exceeds the vehicle speed, reduction of brake pressure is not started irrespective of judgment that brake pressure reduction starting condition is fulfilled.

According to an aspect of the present invention, there is provided an anti-skid control system for motor vehicles, characterized in that when a wheel speed to be controlled and being decelerated through buildup of brake pressure becomes equal to a reference speed which is set up on the basis of the wheel speed in such a manner that said reference speed follows the wheel speed with a predetermined relationship thereto, the equality of the wheel speed to the reference wheel speed is judged as fulfillment of brake pressure reduction starting condition, and thus reduction of the brake pressure is started; the highest one of the wheel speeds is detected; a computed vehicle speed approximate to the real vehicle speed is set up on the basis of the highest wheel speed by limiting the acceleration and deceleration of the highest wheel speed to be in a predetermined range; the computed vehicle speed and the wheel speed to be controlled are compared; and when the comparison indicates that the wheel speed to be controlled is equal to or higher than the computed vehicle speed, reduction of the brake pressure is not started irrespective of the judgment that the brake pressure reduction starting condition is fulfilled.

According to another aspect of the present invention, when the acceleration or deceleration of the wheel speed to be controlled is equal to or higher than a first preset value, the wheel speed is switched to a limited wheel speed having its acceleration or deceleration limited up to a second preset value lower than the first preset value; the reference wheel speed is set up on the basis of the limited wheel speed so that said reference speed does not become equal to the wheel speed to be controlled and thus fulfillment of the brake pressure reduction starting condition is avoided, thereby preventing reduction of the brake pressure from being started; the highest one of the wheel speeds of the motor vehicle is detected when the acceleration or deceleration of the wheel speed to be controlled is lower than said first preset value; a computed vehicle speed approximate to the real wheel speed is set up on the basis of said highest wheel speed by limiting the acceleration and deceleration to be in a predetermined range; the wheel speed to be controlled is compared with the computed vehicle speed; when the comparison indicates that said wheel speed to be controlled is equal to or higher than said computed vehicle speed, no reduction of the brake pressure is started irrespective of the judgment that the brake pressure reduction starting condition is fulfilled.

Other objects, features and advantages of the present invention will become apparent from the ensuing description taken in conjunction with the accompanying drawings.

DESCRIPTION OF THE PREFERRED EMBODIMENTS

Figure 2:
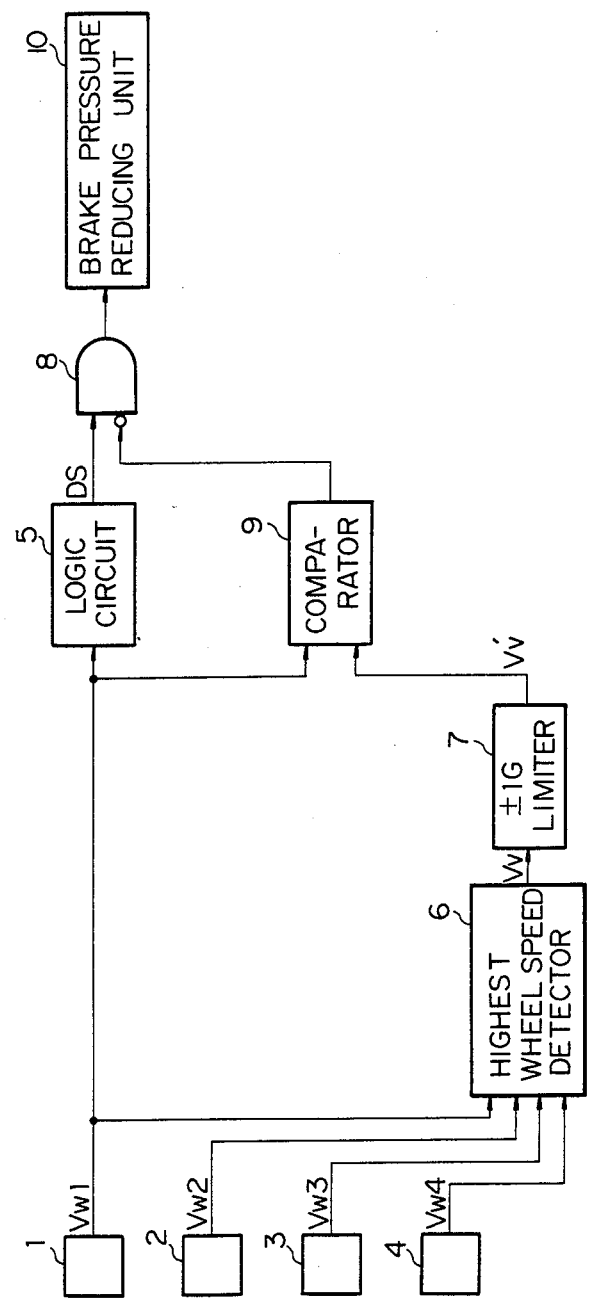
FIG. 2 is a block diagram showing the control circuit of the anti-skid control system according to an embodiment of the present invention.
Figure 3:
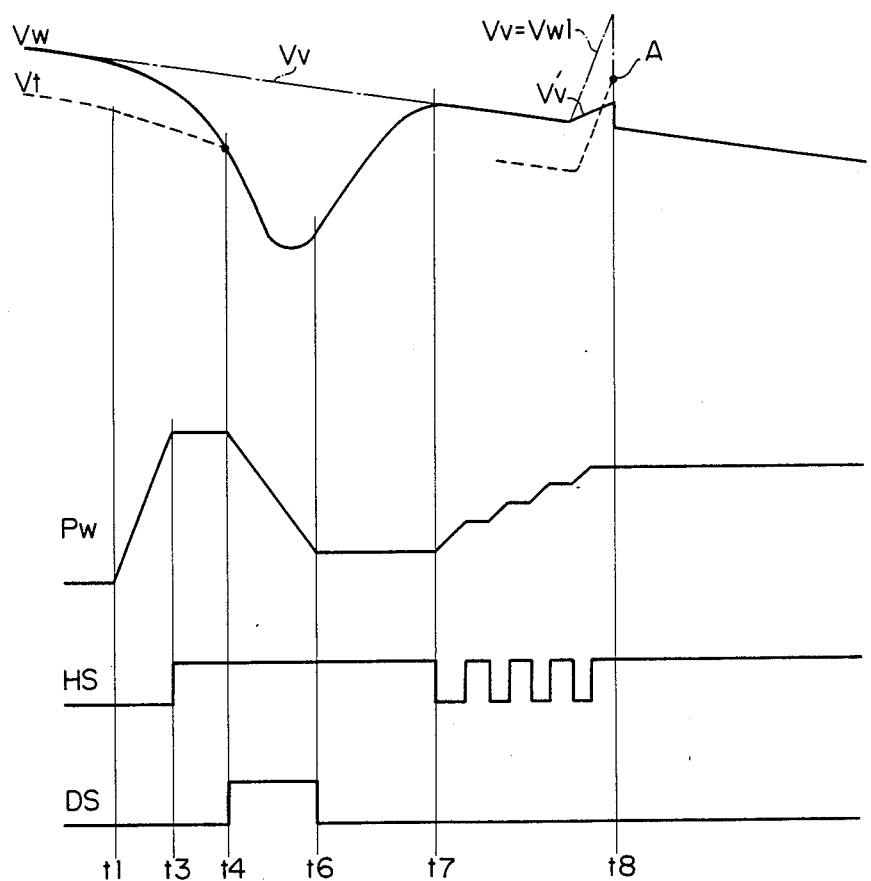
FIG. 3 is a view useful for explaining the operation of the control circuit shonwn in FIG. 2.

Referring to FIG. 2, there is shown, in a block diagram, the control circuit of the anti-skid control system according to an embodiment of the present invention. FIG. 3 illustrates the relationships between the wheel speed Vw controlled by the control circuit of FIG. 2 and the brake pressure Pw, hold signal HS and decay signal DS. The anti-skid control system shown in FIG. 2 inlcudes wheel speed sensors 1 to 4 from which are derived signals representing wheel speeds $Vw_1$, $Vw_2$, $Vw_3$, and $Vw_4$ respectively. The wheel speed $Vw_1$, which is now to be contolled, is inputted to a logic circuit 5.

Figure 1:
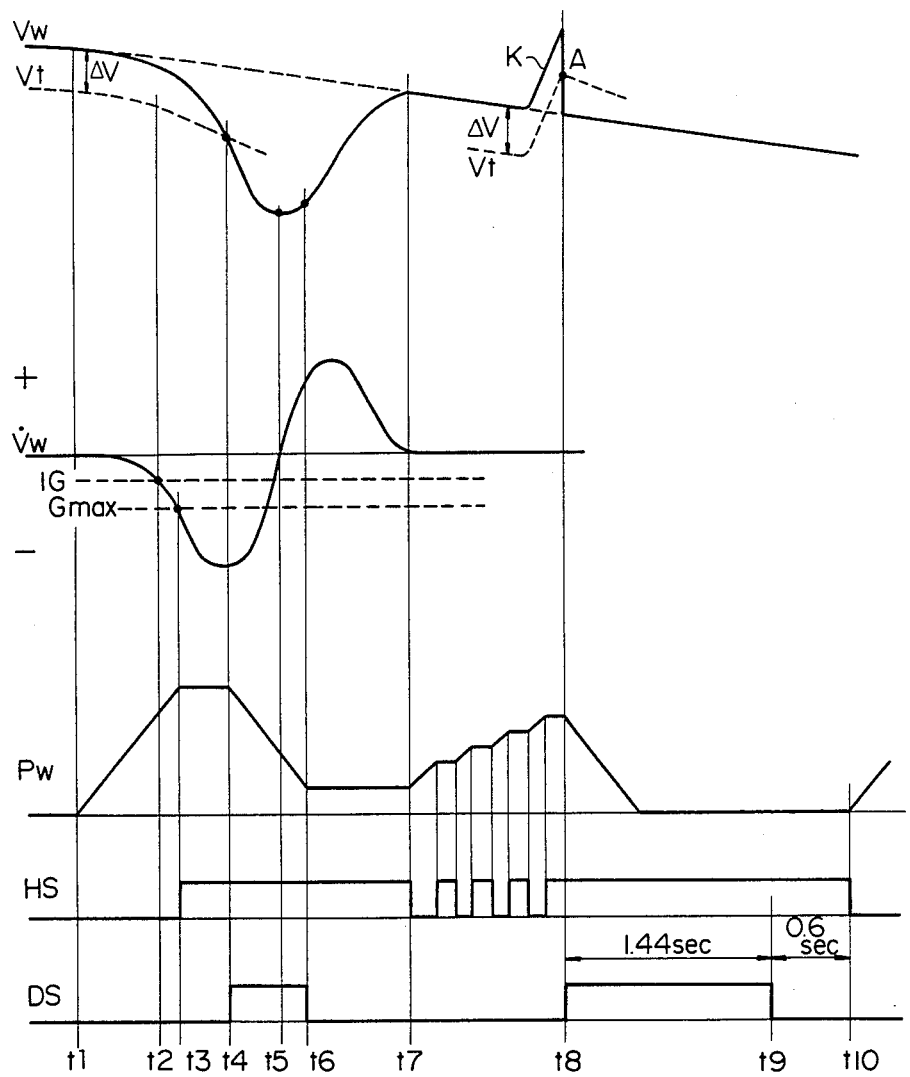
FIG. 1 is a view useful for explaining the operation of the prior-art anti-skid control system.

The respective wheel speeds $Vw_1$ to $Vw_4$ are inputted to a highest-wheel speed detector 6 to select the highest one of those wheel speeds. The highest wheel speed selected in the detector 6 is indicated at $Vv$ in FIG. 3. Thus, if such a phenomenon that the wheel speed $Vw_1$ suddenly exceeds the vehicle speed as mentioned above in connection with FIG. 1, occurs, then the selected highest wheel speed $Vv$ will also represent the same changes as the wheel speed $Vw_1$, as shown by the alternate long and short dash line in FIG. 3.

Subsequently, the selected highest wheel speed $Vv$ is passed through a limiter 7, which is arranged to limit the acceleration and deceleration of the selected highest wheel speed $Vv$ to be in the range from $+1G$ to $-1G$; and in this way, a computed vehicle speed indicated at $Vv'$ in FIG. 3 is set up which is approximate to the real vehicle speed but has its acceleration and deceleration limited to be in the range from $+1G$ to $-1G$. Thus the computed vehicle speed $Vv'$ is only subject to small changes, as will be seen from FIG. 3.

As the wheel speed $Vw_1$ is increased abruptly, the reference wheel speed $Vt$ is also abruptly increased following the wheel speed $Vw_1$, and the curve representing the wheel speed $Vw_1$ and that representing the reference wheel speed $Vt$ cross each other at a point A as shown in FIG. 3; thus, the logic circuit 5 judges that brake pressure reduction starting condition is fulfilled at the point A, i.e., at time $t_8$, so that the decay signal DS is generated which in turn is applied to one of the two input terminals of an AND gate 8, the other input terminal of the AND gate 8 being adapted to serve as an inverting terminal.

The wheel speed $Vw_1$, and the computed vehicle speed $Vv'$ having its acceleration and deceleration limited to be in the range from $+1G$ to $-1G$ are inputted to and compared in a comparator circuit 9 having an output terminal coupled to the inverting terminal of the AND gate 8. The comparator circuit 9 is arranged to provide no output signal in case the wheel speed $Vw_1$ is lower than the computed vehicle speed Vv'. Thus, in such a case, if the decay signal DS is derived from the logic circuit 5, then the AND gate is turned on so that the decay signal DS is supplied to a brake pressure reducing unit 10 through the AND gate 8, and thereupon the decay valves are opened and thus reduction of the brake pressure is started. The comparator circuit 9 is also arranged to provide an output signal in case the wheel speed Vw1 is higher than the computed vehicle speed Vv', i.e., Vw1≧Vv'. In such a case, therefore, even if the decay signal DS is derived from the logic circuit 5 at the time t8, then the AND gate 8 remains turned off and prevents the decay signal DS from being transmitted to the brake pressure reducing unit 10, so that the decay valves remain closed and no reduction of the brake pressure Pw is started.

Figure 4:
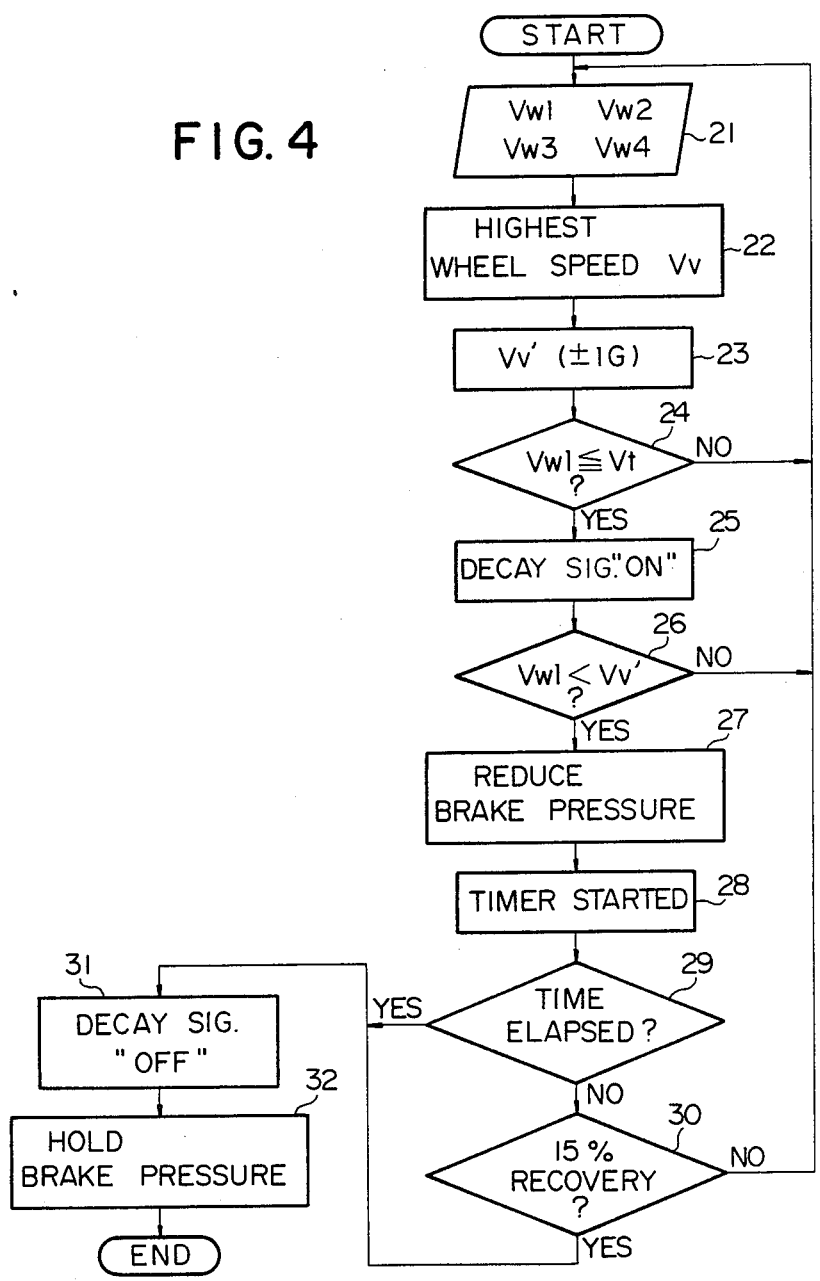
FIG. 4 is a flow chart useful for explaining the operation of the control circuit shown in FIG. 2.

Control of the brake pressure reducing unit 10 by the control circuit shown in FIG. 2 is performed in accordance with the flow chart shown in FIG. 4.

First, at step 21, the respective wheel speeds Vw1 to Vw4 are read in; and then at step 22, the highest one (Vv) of those wheel speeds is detected. Subsequently, at step 23, the highest wheel speed Vv is passed through the limiter 7 (FIG. 2) so that the computed vehicle speed Vv' is established which has its acceleration and deceleration limited in the range from +1G to −1G as mentioned above. At step 24, judgment is made as to whether or not the wheel speed Vw1 reached the level of the reference wheel speed Vt, and if the result of the judgment is "YES", then at step 25, the decay signal DS is generated. If the result of the judgment at the step 24 is "NO", then the process is returned to the step 21. At step 26, the wheel speed Vw1 and computed vehicle speed Vv' compared and if Vw1<Vv', then at step 27 the decay valves are opened, and reduction of the brake pressure Pw is started. Concurrently, at step 28, the timer is started. If the result of the comparison at the step 26 is such that Vw1≧Vv', then the process is returned to the step 21, and no reduction of the brake pressure Pw is started.

At step 29, judgment is made as to whether or not the time set on the timer elapsed, and if the result of the judgment is "NO", then the process is advanced to step 30 where judgment is made as to whether or not 15% recovery of the wheel speed Vw1 from low peak thereof occurred. If the result of the judgment at the step 30 is "YES", then at step 31, the decay signal is interrupted, so that the decay valves are closed and thus the brake pressure Pw is held. If the result of the judgment at the step 29 is "YES", then the process is advanced to step 32 where the decay valves are closed, and thus the brake pressure Pw is held.

Figure 5:
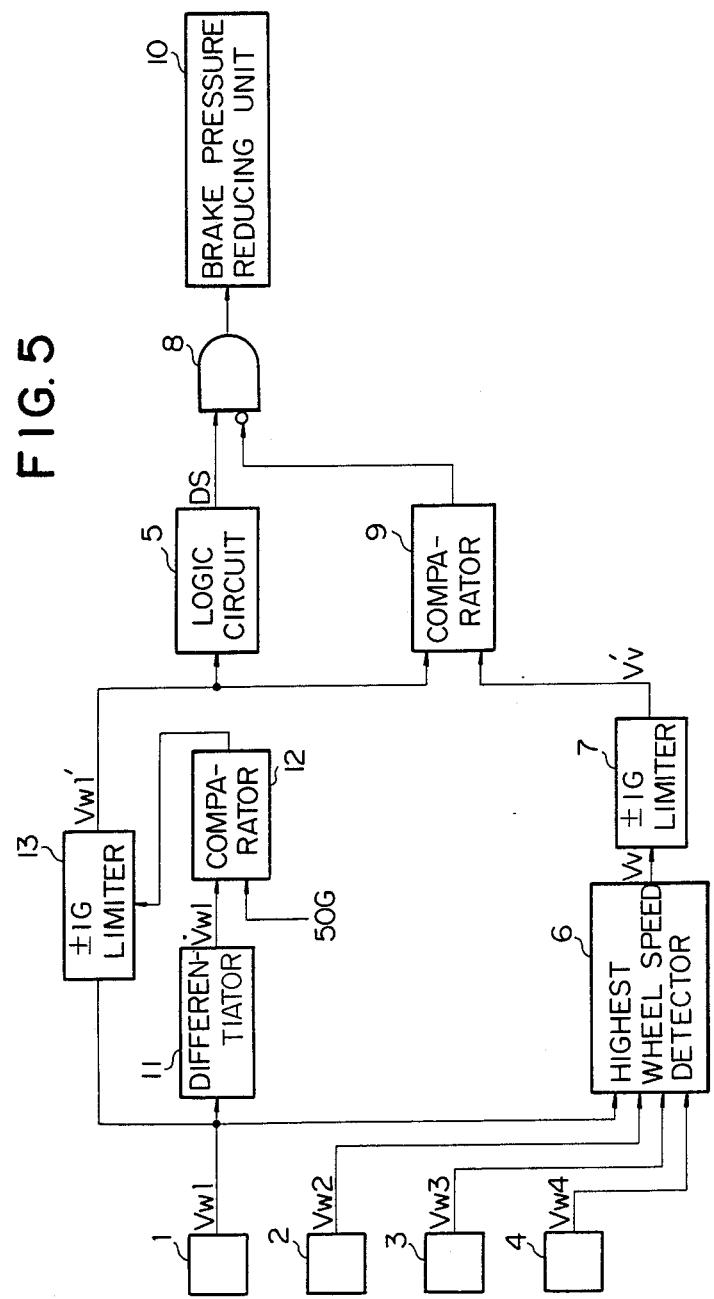
FIG. 5 is a block diagram showing the control circuit of the anti-skid control system according to another embodiment of the present invention.
Figure 6:
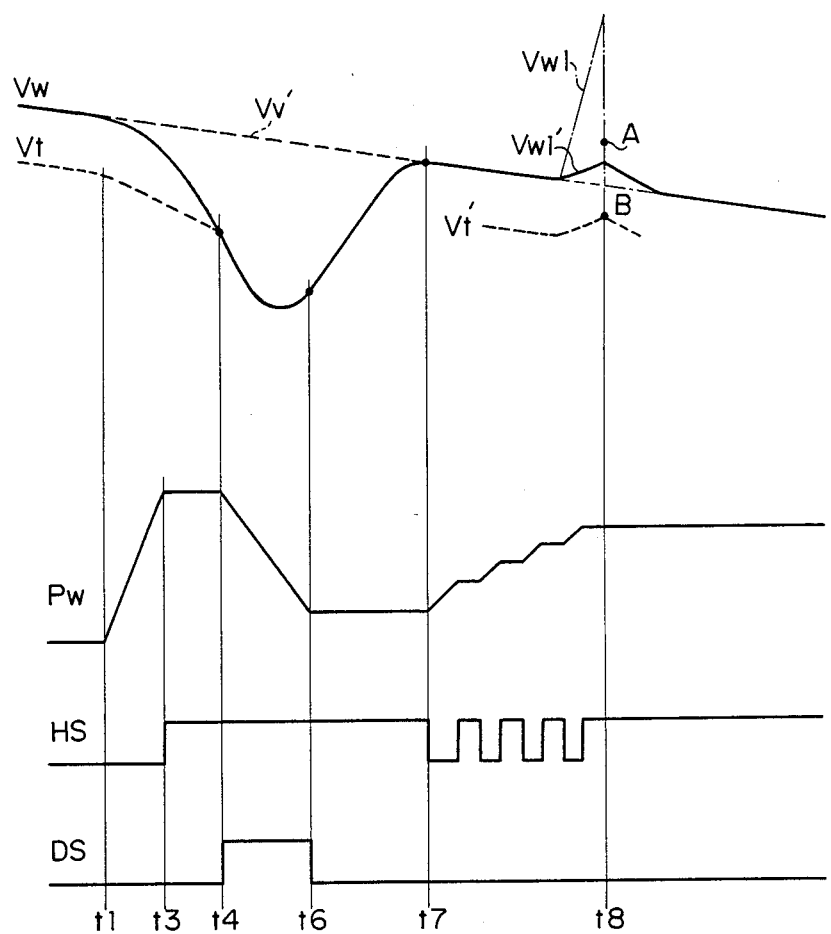
FIG. 6 is a view useful for explaining the operation of the control circuit shown in FIG. 5.

· Referring to FIG. 5, there is shown, in a block diagram, the control circuit of the anti-skid control system according to a second embodiment of the present invention. FIG. 6 illustrates the relationships between the wheel speed Vw to be controlled by the control circuit of FIG. 5, and the brake pressure Pw, hold signal HS and decay signal DS.

In addition to the components incorporated in the arrangement of FIG. 2, it will be noted that the control circuit of FIG. 5, includes a differentiating circuit 11, a comparator circuit 12, and a limiter 13 which is similar to that shown at 7 in FIG. 2. In FIG. 5, therefore, parts corresponding to FIG. 2 are indicated by like reference numerals. With the arrangement of FIG. 5, the wheel speed Vw1 is provided to the differentiating circuit 11 to derive the acceleration or deceleration $+\dot{V}w1$ or $-\dot{V}w1$ of the wheel speed Vw1; the acceleration or deceleration $+\dot{V}w1$ or $-\dot{V}w1$ is compared with preset value of $+50G$ or $-50G$ in the comparator 12; and in case the acceleration or deceleration is equal to or higher than the preset value, then the comparator 12 provides an output, in response to which the limiter 13 is operated so that variations in the wheel speed Vw1 are limited to be in the range from $+1G$ to $-1G$ and thus at the output terminal of the limiter 13, there occurs the wheel speed Vw1' having the acceleration and deceleration limited to be in the range from $+1G$ to $-1G$. The limiter 13 is also designed such that in case the acceleration or deceleration of the wheel speed Vw1 does not exceed the preset value $+50G$ or $-50G$, then the wheel speed Vw1 appears at the output terminal thereof as it is. This embodiment is characterized in that in case the acceleration or deceleration of wheel speed Vw1 is equal to or higher than the preset value $+50G$ or $-50G$, then instead of the real wheel speed Vw1, the wheel speed Vw1' having its acceleration and deceleration limited by the limiter 13 to be in the range from $+1G$ to $-1G$, is judged in the logic circuit 5. The reference wheel speed is made to follow the wheel speed Vw1' as indicated at Vt'; thus, at time t8 when the wheel speed Vw1 momentarily exceeds the vehicle speed, i.e., when "whisker" occurs, the reference wheel speed Vt' has such a magnitude as indicated at B and never crosses the wheel speed Vw1, so that the logic circuit 5 provides no decay signal DS. It will be apparent that since the aforementioned wheel speed Vw1' and the computed vehicle speed Vv' are compared in the comparator 9, the embodiment of FIG. 5 operates in substantially the same manner as the embodiment of FIG. 2 when the acceleration or deceleration of the wheel speed Vw1 do not exceed the preset value of $+50G$ or $-50G$.

Figure 7:
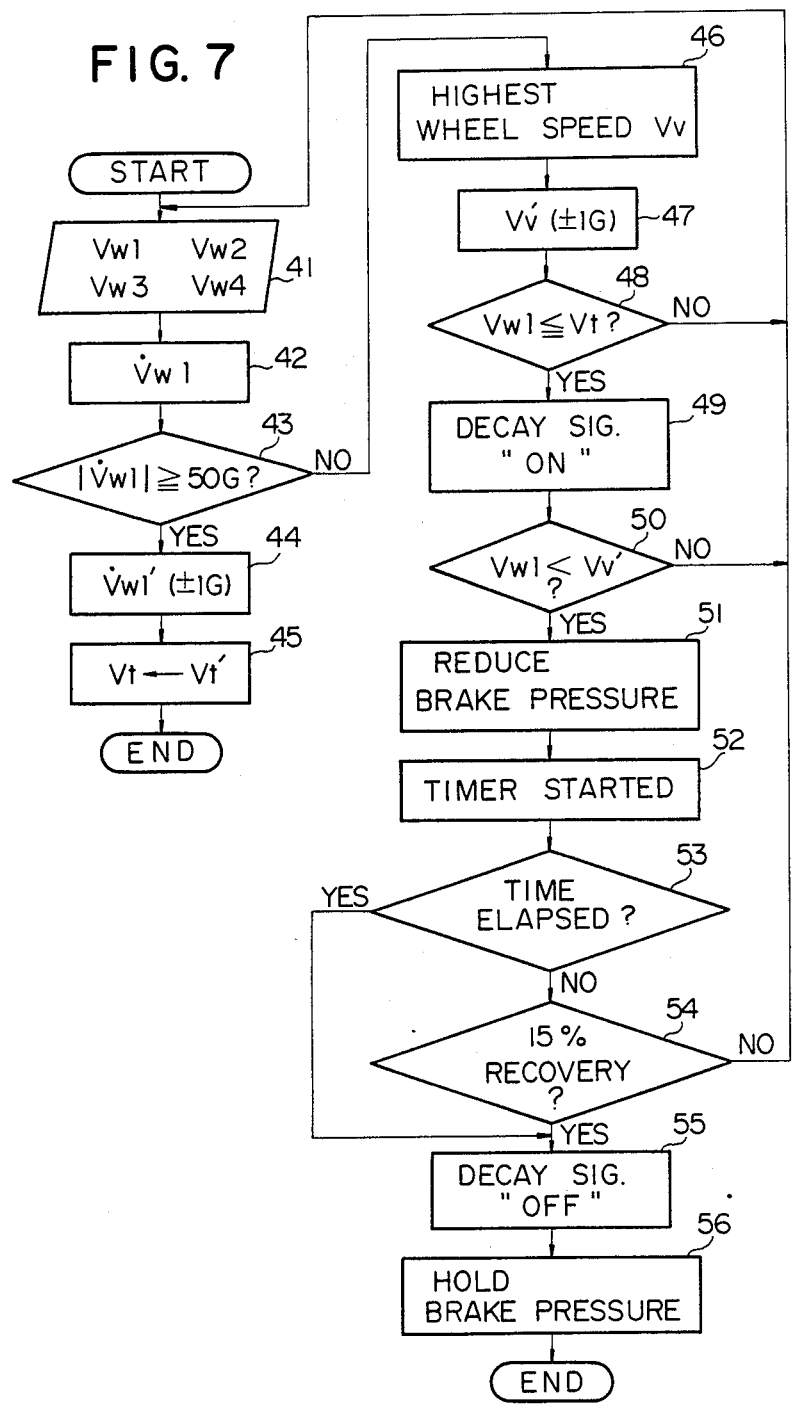
FIG. 7 is a flow chart useful for explaining the operation of the control circuit shown in FIG. 5.

FIG. 7 is a flow chart illustrating the manner in which the brake pressure reducing unit 10 is controlled by the control circuit of FIG. 5. At step 41, the respective wheel speeds Vw1 to Vw4 are read in; and then at step 42, the acceleration and deceleration $\dot{V}w1$ and $-\dot{V}w1$ of the wheel speed Vw1 are derived. Subsequently, at step 43, the absolute value of the acceleration or deceleration $+\dot{V}w1$ or $-\dot{V}w1$ is compared with 50G, and if $|\dot{V}w1|\geq 50G$, then at step 44, the wheel speed Vw1 is switched to the wheel speed Vw1' having its acceleration and deceleration limited to be in the range from $+1G$ to $-1G$. At step 45, the reference wheel speed Vt' is set up on the basis of the wheel speed Vw1'. In this case, the brake pressure reduction starting condition (Vw1'≦Vt') is not fulfilled, so that no brake pressure reduction is permitted, and the process is finished.

If $|\dot{V}w1|<50G$ at the step 43, then the process is advanced to step 46 where the highest wheel speed Vv is detected. The remaining steps 47 to 56 are similar to the steps 23 to 32 in FIG. 4, and therefore further description thereof will be omitted.

As will be appreciated from the above discussion, according to the present invention, when the wheel speed is abnormally increased over the vehicle speed, i.e, when so-called "whisker" occurs as a result of the wheel behavior being abruptly changed for one reason or another during anti-skid control operation, no brake pressure reduction mode is permitted to occur, so that occurrence of non-braking condition can be prevented.

While the present invention has been described and illustrated with respect to specific embodiments thereof, it is to be understood that the present invention is by no means limited thereto but encompasses all changes and modifications which will become possible within the scope of the appended claims.

We claim:

1. In an anti-skid control system for a motor vehicle, wherein when a wheel speed to be controlled and being decreased through buildup of brake pressure becomes equal to a reference wheel speed which is set up on the basis of the wheel speed in such a manner that said reference wheel speed follows said wheel speed with a predetermined relationship thereto, the equality of said wheel speed to said reference wheel speed being a fulfillment of a brake pressure reduction starting condition, and thus reduction of the brake pressure is started so that there is a change in said wheel speed from decrease to increase; and on the basis of a detection of a low peak of said wheel speed where there is a change in said wheel speed from decrease to increase, the reduction of the brake pressure is stopped so that the brake pressure is held; said anti-skid control system comprising:

means for detecting the highest one of the wheel speeds of the motor vehicle;

means for generating a signal representative of said highest wheel speed;

means for limiting a rate of decrease and increase of said highest wheel speed signal with respect to time to be in a predetermined range;

means for setting up a computed vehicle speed on the basis of said highest wheel speed signal by having the rate of decrease and increase thereof with respect to time limited by said limiting means;

means for comparing said computed vehicle speed with the wheel speed to be controlled; and means adapted, when the wheel speed to be controlled is equal to or higher than said computed vehicle speed, for preventing reduction of the brake pressure from being started irrespective of whether the brake pressure reduction starting condition is fulfilled.

2. A control system according to claim 1, wherein the rate of decrease and increase of the highest wheel speed signal is limited to be in the range from $+1G$ to $-1G$.

3. In an anti-skid control system for a motor vehicle, wherein when a wheel speed to be controlled and being decreased through buildup of brake pressure becomes equal to a reference wheel speed which is set up on the basis of the wheel speed in such a manner that said reference wheel speed follows said wheel speed with a predetermined relationship thereto, the equality of said wheel speed to said reference wheel speed being a fulfillment of a brake pressure reduction starting condition, and thus reduction of the brake pressure is started so that there is a change in said wheel speed to be controlled from decrease to increase; and on the basis of a detection of a low peak of said wheel speed where there is a change in said wheel speed from decrease to increase, the reduction of the brake pressure is stopped so that the brake pressure is held; said anti-skid control system comprising:

means adapted, when the increase or decrease of the wheel speed to be controlled is equal to or higher than the first preset valve, for switching said wheel spped signal to a limited wheel spped having its increase or decrease limited to the second preset valve;

means for generating a signal representative of a first preset value of the increase and increase of the wheel speed and for generating a signal representative of a second preset value of the increase and decrease of the wheel speed and lower than the first preset value;

means for setting up the reference wheel speed on the basis of said limited wheel speed so that said reference speed does not become equal to said wheel speed to be controlled and thus fulfillment of the brake pressure reduction starting condition is avoided, thereby preventing reduction of the brake pressure from being started;

means for detecting the highest one of the wheel speeds of the motor vehicle when the increase or decrease of the wheel speed to be controlled is lower than said first preset value;

means for generating a signal representative of said highest wheel speed;

means for limiting a rate of increase and decrease of said highest wheel speed signal with respect to time to be in a predetermined range;

means for setting up a computed vehicle speed on the basis of said highest wheel speed signal by having the rate of increase and decrease thereof with respect to time limited by said limiting means;

means for comparing said computed vehicle speed with said wheel speed to be controlled; and means adapted, when said wheel speed to be controlled is equal to or higher than said computed vehicle speed, for preventing reduction of the brake pressure from being started irrespective of whether the brake pressure reduction starting condition is fulfilled.

4. A system according to claim 3, wherein said first preset value is $+50G$ or $-50G$; said second preset value is $+1G$ or $-1G$; and the rate of increase and decrease of the highest wheel speed signal is limited to be in the range from $+1G$ to $-1G$.

* * * * *

UNITED STATES PATENT AND TRADEMARK OFFICE
CERTIFICATE OF CORRECTION

PATENT NO. : 4,762,375
DATED : August 9, 1988
INVENTOR(S) : Takao Maki, et al

It is certified that error appears in the above-identified patent and that said Letters Patent are hereby corrected as shown below:

Title Page, Item [30] should read:

[30] Foreign Application Priority Data
Dec. 27, 1985 [JP] Japan............60-292999

Signed and Sealed this

Twenty-ninth Day of November, 1988

Attest:

DONALD J. QUIGG

*Attesting Officer*  *Commissioner of Patents and Trademarks*